United States Patent Office 2,959,695
Patented Nov. 8, 1960

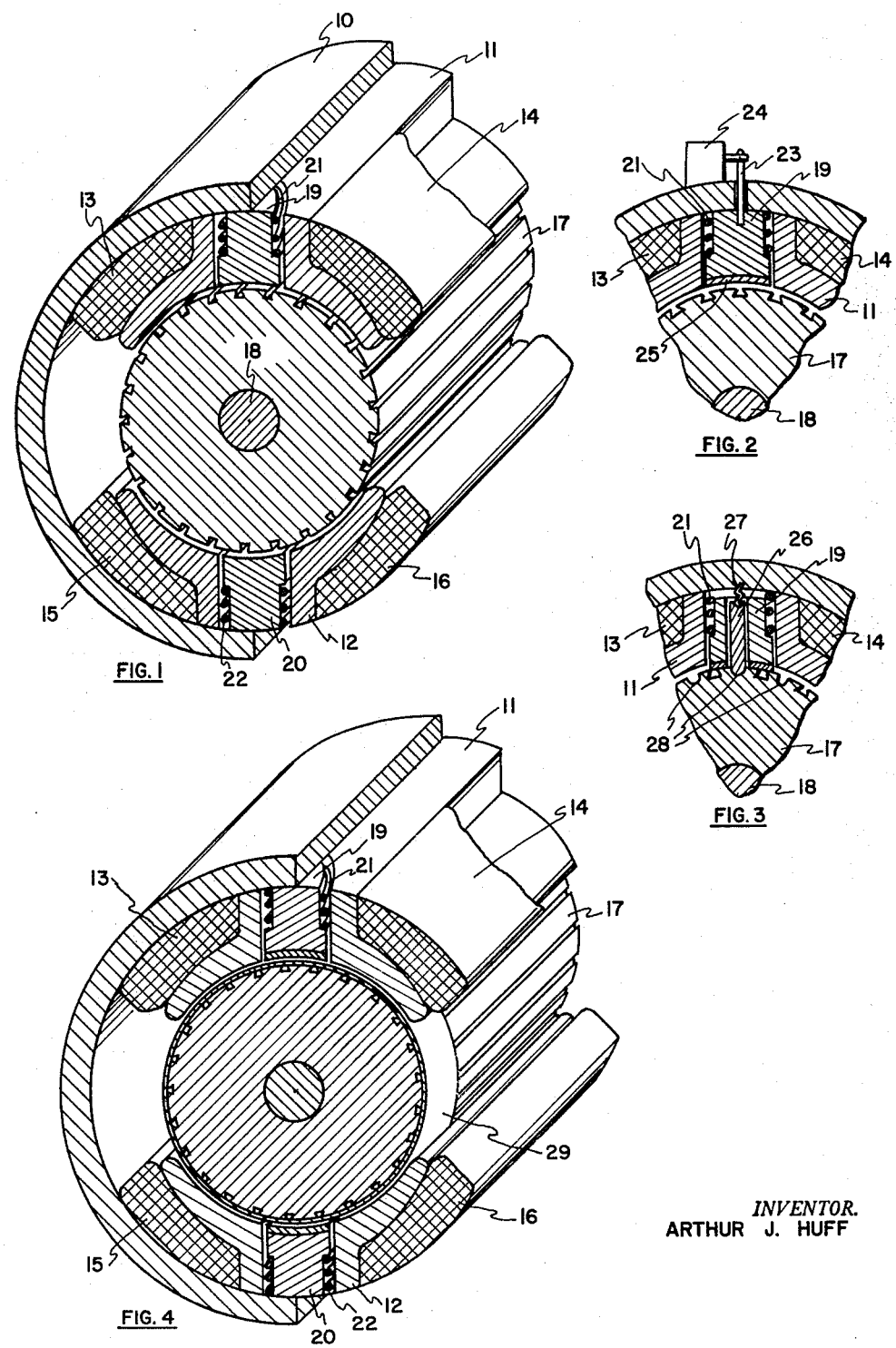

2,959,695

MAGNETIC MOTOR POLE PIECE RADIAL BRAKE

Arthur J. Huff, Grand Rapids, Mich., assignor to Lear, Incorporated

Filed Dec. 31, 1958, Ser. No. 784,142

8 Claims. (Cl. 310—77)

This invention relates to electric motors and more particularly to brakes for electric motors.

It is desirable in some instances to have the motor output shaft stop rotating as soon as possible after the motor has been de-energized. In the past, most electromagnetic brakes have been used in conjunction with motors to stop the output shaft from rotating when the motor is de-energized. This type of brake usually incorporates a spring to urge the braking disc or arms against the output shaft. This same type of brake requires a magnetic field to disengage the brake. In the past this magnetic field has been established in one of two ways: One way is to extend the stator pole pieces thereby using the main flux path of the motor to disengage the brake. In this case, the main flux path has to be altered thereby reducing the efficiency of the motor and greatly increasing the complexity, cost, weight and overall length of the motor. A second way to meet the problem is to have an auxiliary winding to operate the brake. This leaves the main flux path of the motor undisturbed but again increases the complexity, cost, weight and length of the motor while decreasing the reliability of the motor.

It is, therefore, an object of the present invention to provide a brake for an electric motor which utilizes the main flux path but does not appreciably alter the main flux path.

Another object of the present invention is to provide a brake for an electric motor which does not increase the overall weight or size of the motor.

Still another object of this invention is to provide a brake for an electric motor with a minimum amount of complexity and cost.

Other objects and advantages of the present invention will become apparent from the following description when taken in conjunction with the drawings in which:

Fig. 1 is a partial sectional view cutting the motor in half;

Fig. 2 is a section of the brake incorporating an external switch;

Fig. 3 is a sectional view of the brake incorporating a positive locking means for the brake; and Fig. 4 is a sectional view of the motor incorporating a brake band on the rotor.

Referring now to Fig. 1 there is shown a housing 10. Pole pieces 11 and 12 are located within and fixed to the housing 10. Windings 13 and 14 are located adjacent to the pole piece 11 and windings 15 and 16 are located adjacent the pole piece 12. A rotor 17 is mounted on a shaft 18 and rotatably supported by the housing 10 between the pole pieces 11 and 12. Plungers 19 and 20 are located respectively in pole pieces 11 and 12. Springs 21 and 22 urge the plungers 19 and 20 respectively toward the rotor 17. Note that in Fig. 1 the plungers 19 and 20 are withdrawn from the rotor 17 allowing the rotor 17 to rotate with respect to the housing 10.

In operation when the motor is de-energized, the springs 21 and 22 urge the plungers 19 and 20 respectively against the rotor 17 thereby restricting rotation of the rotor 17. When the motor is energized, a magnetic flux path is built up in the pole pieces 11 and 12. It can be seen that when the plungers are against the rotor 17, the flux path passing through the pole pieces 11 and 12 and plungers 19 and 20 would be actually distorted. The flux exerts a force in trying to find the path of least reluctance. Hence the plungers 19 and 20 are pulled away from the rotor 17 and the flux path passing through the plungers 19 and 20 then has a straight path or the path of least reluctance. It is understood that the springs 21 and 22 are chosen to provide a force to the plungers that will stop the rotor 17 from rotating but which force is small enough to be overcome by the flux force in the pole pieces 11 and 12.

It is often desirable to operate a series of circuit brakers or a second motor as a function of the engaged or disengaged condition of the first motor. Fig. 2 shows a second embodiment of the present invention wherein a shaft 23 extends from the plunger 19. A switch 24 is attached to and operated by the shaft 23. Switch 24 then operates, by way of electrical connections (not shown), an external motor or circuit breakers in response to the braking and releasing of the rotor 17 by the plunger 19.

A brake lining 25 of asbestos or similar material may be positioned on that portion of plunger 19 which comes in contact with the rotor 17 to reduce wear on the rotor 17.

Fig. 3 shows a third embodiment of the present invention providing a positive locking means for the rotor 17. In this case the plunger 19 is positioned in the pole piece 11 in the same manner as described in Figs. 1 and 2. However, a piston 26 is positioned in a hole in the plunger 19 and a second spring 27 urges the piston 26 against the rotor 17. In this embodiment, the rotor 17 has cut outs 28 to accommodate the piston 26. The spring 27 in this case is chosen to be weaker than the spring 21. Now it can be seen that as the flux builds up due to the energization of the motor, the weaker spring 27 will be overcome first by the flux urging the piston 26 against the housing 10 before the spring 21 is overcome by the flux urging the plunger 19 against the housing 10. Hence the positive locking means is released first and then the sliding brake or plunger 19 is released permitting the rotor 17 to rotate. When the motor is de-energized and the flux starts to decrease, the stronger spring 21 will urge the plunger 19 against the rotor 17 first, substantially stopping the rotor 17 from rotating and then when the flux decreases, the weaker spring 27 will urge the piston 26 against the rotor 17 and into one of the slots 28 thereby providing a positive lock for the rotor 17.

Fig. 4 shows still another embodiment of the present invention wherein a brake band 29 is placed on the rotor 17 to further increase the life of the brake and subsequently the motor. The brake band 29 preferably is constructed of a non-magnetic material such as bronze or copper. As shown in Fig. 4, the plungers 19 and 20 are urged against the brake band 29 by the springs 21 and 22 when the motor is de-energized.

Although the present invention has been described with a certain degree of particularity, it is understood that various modifications in the details and arrangements of parts may be had without departing from the spirit and scope of the invention as hereinafter claimed.

I claim:

1. An electric motor comprising a housing, a stator mounted within and fixed to said housing, a rotor rotatably supported by said housing, braking means embedded in said stator said braking means having freedom of movement with respect to said stator and resilient means for urging said braking means against said rotor, said braking means being arranged to be drawn away from said rotor and against said resilient means by the flux build up in said stator when said motor is energized.

2. An electric motor comprising a rotor and stator, said stator including stator windings, pole pieces, a plurality of plungers, said pole pieces having said plungers mounted in recesses in said pole pieces, and resilient means urging said plungers against said rotor, said plungers being of magnetic material such that when said stator windings are energized, the flux build up causes said plungers to be magnetically drawn away from said rotor.

3. An electric motor comprising a housing, a stator rigidly fixed to said housing, a rotor rotatably supported by said housing and mounted within said housing such that a flux gap exists between said rotor and said stator, said stator having electric windings and pole pieces, plungers constructed of magnetic material slidably mounted in recesses in said pole pieces, and resilient means urging said magnetic plungers against said rotor, said resilient means being strong enough to hold said plungers against said rotor thereby restricting movement of said rotor and weak enough to be overcome by the flux force urging said plunger in alignment with said pole piece when said windings are energized thereby providing a motor brake without appreciably altering the normal flux path of the motor.

4. The device as claimed in claim 3 wherein said plunger has a brake shoe on that portion thereof which contacts said rotor.

5. The device as claimed in claim 3 wherein said rotor has a braking band on the circumference thereof which is in frictional contact with said plunger when said coil is de-energized.

6. The device as claimed in claim 3 wherein a shaft is attached to said plunger and extends through said housing to operate an external switch simultaneously with the braking and releasing of said rotor.

7. An electric motor and brake for the same comprising a housing, a rotor rotatably supported by and within said housing, and a stator having windings, pole pieces and brake means positioned between said rotor and said housing, said brake means including first and second plungers constructed of magnetic material slidably mounted in said pole pieces, and first and second spring means positioned to urge said first and second plungers respectively in contact with said rotor, one of said spring means being weaker than the other spring means such that gradual flux build up in said pole pieces causes one of said plungers to move away from said rotor and against said weaker spring prior to the other of said plungers moving away from said rotor against said stronger spring.

8. The device as claimed in claim 7 wherein said rotor has indentations on the circumference thereof to accommodate said plunger urged against said rotor by said weaker spring thereby providing a positive locking means when said plunger enters said indentations.

References Cited in the file of this patent

FOREIGN PATENTS 1,098,914    France _____ Mar. 16, 1955